United States Patent [19]
Liu et al.

[11] Patent Number: 5,485,465
[45] Date of Patent: Jan. 16, 1996

[54] REDUNDANCY CONTROL FOR A BROADCAST DATA TRANSMISSION SYSTEM

[75] Inventors: Ming Liu; Charles H. Marsh, both of Raleigh, N.C.

[73] Assignee: The Whitaker Corporation, Wilmington, Del.

[21] Appl. No.: 885,962

[22] Filed: May 20, 1992

[51] Int. Cl.⁶ .................................................. G06F 11/00
[52] U.S. Cl. .................... 395/182.02; 371/62; 370/16
[58] Field of Search ................... 371/7, 8.1, 8.2, 371/11.1, 11.2, 5.1, 5.3, 5.5, 62, 20.1, 20.2

[56] References Cited

U.S. PATENT DOCUMENTS

| | | | |
|---|---|---|---|
| Re. 28,958 | 9/1976 | Zafiropulo et al. | 340/147 SC |
| Re. 31,852 | 3/1985 | Solderbloom et al. | 370/90 |
| 3,456,242 | 7/1969 | Lubkin et al. | 340/172.5 |
| 3,483,329 | 12/1969 | Hunkins | 179/15 |
| 3,597,549 | 8/1971 | Farmer | 179/15 AL |
| 3,676,859 | 7/1972 | Hollaway et al. | 340/172.5 |
| 3,851,311 | 11/1974 | Mila | 340/147 |
| 4,017,828 | 4/1977 | Watanabe et al. | 371/8.2 |
| 4,159,470 | 6/1979 | Strojny et al. | 340/147 SC |
| 4,169,220 | 9/1979 | Fields | 179/175.3 |
| 4,233,589 | 11/1980 | Rawson et al. | 340/147 R |
| 4,264,893 | 4/1981 | Hutch | 340/147 |
| 4,369,524 | 1/1983 | Rawson et al. | 455/606 |
| 4,380,061 | 4/1983 | Mori et al. | 370/16 |
| 4,422,179 | 12/1983 | Albanese | 455/601 |
| 4,446,551 | 5/1984 | Seo | 370/16 |
| 4,491,942 | 1/1985 | Witte et al. | 370/4 |
| 4,519,070 | 5/1985 | Bell | 370/88 |
| 4,530,085 | 7/1985 | Hamada et al. | 370/15 |
| 4,538,264 | 8/1985 | Bahr et al. | 371/8 |
| 4,542,496 | 9/1985 | Takeyama et al. | 370/16 |
| 4,580,872 | 4/1986 | Bhatt et al. | 350/96.16 |
| 4,633,246 | 12/1986 | Jones et al. | 340/825.05 |
| 4,644,587 | 2/1987 | Takahashi et al. | 455/601 |
| 4,646,286 | 2/1987 | Reid et al. | 370/16 |
| 4,677,619 | 6/1987 | Kawai | 371/5 |
| 4,709,365 | 11/1987 | Beale et al. | 371/8 |
| 4,809,264 | 2/1989 | Abraham et al. | 370/76 |
| 4,961,190 | 10/1990 | Nakajima | 371/8.2 |
| 4,998,251 | 5/1991 | Sadot | 371/37.1 |
| 5,077,730 | 12/1991 | Arrowood | 370/16 |
| 5,153,874 | 10/1992 | Kohno | 370/13 |
| 5,200,949 | 4/1993 | Kobayashi | 370/16 |

FOREIGN PATENT DOCUMENTS

| | | | |
|---|---|---|---|
| 0240145 | 10/1988 | Japan | 371/7 |
| 0262936 | 10/1988 | Japan | 371/7 |
| 0054948 | 3/1989 | Japan | 371/7 |
| 0238355 | 9/1989 | Japan | 371/8.1 |
| 0137923 | 5/1992 | Japan | 371/8.1 |
| 5145530 | 6/1993 | Japan | 371/8.1 |
| 2114858 | 8/1983 | United Kingdom | H04L 11/16 |

OTHER PUBLICATIONS

Arsenault and Roberts—Reliability and Maintainability of Electronic Systems—1980—Computer Science Press Inc.
AFIPS Conference Proceedings—p. 36—1970—Spring Joint Computer Conference—p. 375—382.
"Reliability Analysis and Architecture by Francis P. Mathur and Algirdas Avizienis".
IEEE Transactions on Computers vol. C20 No. 5 May 1971 (pp. 536–542).
Garcia–Molina, et al., "Agressive Transmissions Over Redundant Paths", IEEE, Jul. 1991, pp. 198–207.

(List continued on next page.)

Primary Examiner—Robert W. Beausoliel, Jr.
Assistant Examiner—Ly V. Hua

[57] ABSTRACT

Apparatus and method for a broadcast communications network for comparing the information received on both a primary and secondary communication link. The absence of a packet of information on the primary link within a predetermined period of time of receipt of a corresponding packet on the secondary link generates an error signal to change the count in a counter in a predetermined direction. When the count reaches a predetermined number the secondary is switched to become the primary link.

8 Claims, 3 Drawing Sheets

OTHER PUBLICATIONS

Draft Supplement to ANSI/IEEE Std. 802.3–1990, Type 10BASE–F, Fiber Optic Inter–Repeater Link, Dec. 16, 1991.

ANSI/IEEE 802.4–1985, Token Bus Access Method And Physical Layer Specifications, pp. 55, 56, 78.

ANSI/IEEE Std. 802.3–1990, CSMA/CM Access Method, pp. 39–40, 56–57.

ANSI/IEEE Std. 802.3–1989, Supplements to ANSI/IEEE Std. 802.3, pp. 40–42.

Chipcom Corporation Brochure, Southborough, Mass., Online Fiber Module, Sep. 1990.

Du Pont Electronics–LAN One Plus Token Ring, Token Ring Transceiver, Jun. 1990.

Du Pont Electronics–LAN One Plus Token Ring, Token Ring Media System, Jan. 1991.

Ross, Floyd E., "Rings Are 'Round For Good?", IEEE Network Magazine, Jan. 1987–vol. 1, No. 1, pp. 31–38.

Strole, Norman C., "The IBM Token—Ring Network–A Functional Overview" IEEE Network Magazine, Jan. 1987–vol. 1, No. 1, pp. 23–30.

Pitt, Daniel, "Standards For The Token Ring", IEEE Network Magazine, Jan. 1987–vol. 1, No. 1, pp. 19–22.

Dixon, Roy C., "Lore Or The Token Ring", IEEE Network Magazine, Jan. 1987–vol. 1, No. 1, pp. 11–18.

Du Pont Electronics–Fiber optic Token Ring LANs—A Tutorial, Jun. 1, 1991.

Kelley et al., "Transceiver Design and Implementation Experience In An Ethernet–Compatible Fiber Optic Local Area Network", IEEE 1984 Proceedings of Infocom.

NEC Brochure, "Ring 1.12GB Fiber Optic Transmission System", 6 pages.

Rockwell International Corp. Brochure, "DML–45 Digital Multiplex Lightwave System", Aug. 1983.

Tanenbaum, "Computer Networks", Prentice Hall, (2d Edition, 1989), pp. 153–157 (§3.4.3, IEEE Standard 802.5: Token Ring), pp. 166–168 (§3.5.1, FDDI).

Siecor Brochure, Siecor Corporation, Sep. 29, 1989.

KEY
G2        G2 CONCENTRATOR
G2EOM     G2 ETHERNET
          OPTICAL MODULE 10
G1        G1 CONCENTRATOR
EDM-001   ETHERNET FIBER OPTIC
          DUAL-PORT MODULE
P         PRIMARY PATH
S         SECONDARY PATH
FOMAU     FIBER OPTIC MEDIA
          ATTACHMENT UNIT

REDUNDANCY CONTROL FOR A BROADCAST DATA TRANSMISSION SYSTEM

BACKGROUND OF THE INVENTION

1. Field of the Invention

The present invention relates to a broadcast data communications network, such as a network conforming to IEEE 802.3 FOIRL (Fiber Optic Inter-Repeater Link) standard and, more particularly, to an apparatus and method for implementing a redundancy control function in such a network.

2. Description of the Prior Art

U.S. Pat. No. 4,709,365 (Beale et al.) discloses a sequential (ring) data transmission network in which dual rings reconfigure into a single ting after a failure.

U.S. Pat. No. 4,809,264 (Abraham et al.) discloses a collision signal detection system for use in a data transmission network.

Properties of broadcast networks are described in IEEE 802.4–1985, Token Bus Access Method, page 55, items (1)–(5) and (7). Slot time terminology is defined in IEEE 802.3–1985 CSMA/CD Access Method, page 39, 56 and IEEE 802.4–1985, pages 56, 78

The fiber optic communication system apparatus sold by Chipcom Corporation, Southborough, Mass. as the ONline™ fiber module provides fiber optic connectivity between two stations operating in accordance with IEEE 802.3 10BASE-F draft standard. Both primary and secondary communications links are defined. The apparatus provides a redundancy control for fault recovery only in the event that the stations are communicating in the synchronous mode.

It is believed desirable to provide an arrangement able to provide redundancy;control for stations communicating over a broadcast network.

SUMMARY OF THE INVENTION

In one aspect the present invention relates to an apparatus for a station in a broadcast network that is connectible with a second station over both a first link and a second link. During fault-free operation information packets are received over both of the links, with one of the links defining the primary communications link and the other of the links defining the secondary communications link between the stations. Transmissions between the stations over the first and the second links may be conducted in either a synchronous or an asynchronous communications mode.

The apparatus of the present invention includes first means connected to both the first and the second links for generating an indication signal representative of the arrival of an information signal over either the first or the second link. Logic means responsive to the indication signal is provided for generating an error signal in the event of the absence of an information signal on one of the links within a predetermined time period following the receipt of an information signal over the other of the links. Means responsive to the error signal is provided for switching the primary communications link from the first link to the second link and for switching the secondary communications link from the second link to the first link upon the occurrence of a predetermined number of error signals.

In another aspect, the invention comprises a method for switching between a first link and a second link connecting a first station with a second station in a broadcast network. During fault-free operation, one of the links is the primary communications link between the stations and the other of the links is the secondary communications link.

The method comprises the steps of generating an indication signal representative of the arrival of an information packet over either the first or the second links. In response to the indication signal, an error signal is generated in the event of the absence of an information signal on one of the links within a predetermined time period following the receipt of an information signal over the other of the links. Upon the occurrence of a predetermined number of error signals, the primary communications link is switched to the second link and the secondary communications link is switched to the first link.

BRIEF DESCRIPTION OF THE DRAWINGS

The invention will be more fully understood from the following detailed description, taken in accordance with the accompanying drawings, which form a part of this application and in which.

DETAILED DESCRIPTION OF THE INVENTION

Figure 1:
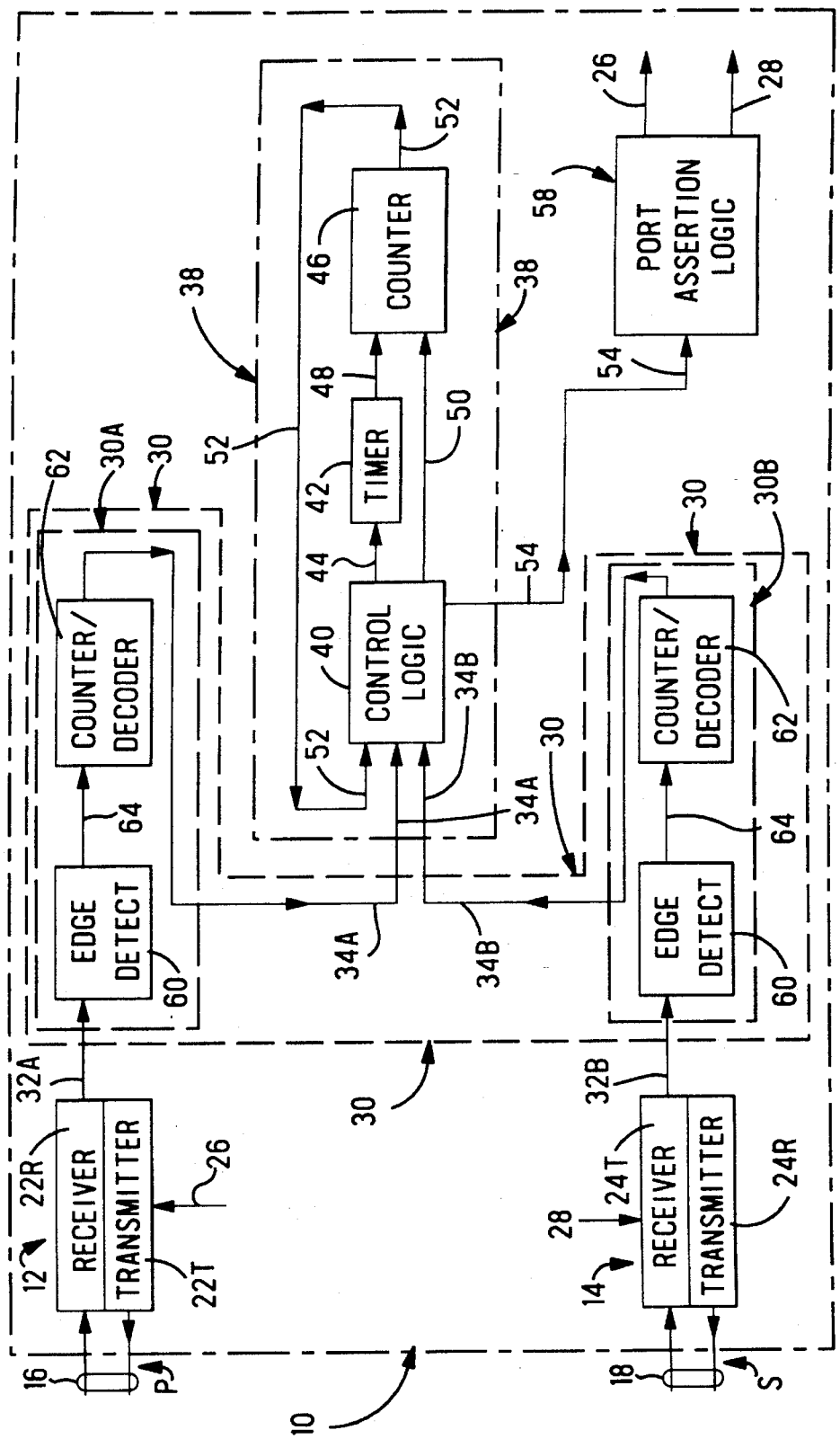
FIG. 1 is a functional block diagram of an apparatus in accordance with the present invention.

Throughout the following detailed description similar reference numerals refer to similar elements in all Figures of the drawings.

With reference to FIG. 1 shown is a functional block diagram of an apparatus generally indicated by reference character 10 in accordance with the present invention. The apparatus 10 forms part of a first station connected within a broadcast communications network. It should be understood that although the invention will be described hereinafter in terms of a broadcast network using fiber optic media as the connection links between stations in the network the invention is applicable to a broadcast network implemented with other media such as coaxial cable, shielded or unshielded twisted pair cables, or wireless.

The apparatus 10 includes at least one pair of communications ports 12, 14 through which the apparatus 10 is interconnectible with a second station in the network. In typical implementation, as will be developed, the apparatus 10 includes at least three pairs of ports. The apparatus 10 is connected at its first port 12 both to transmit optical signals into and to receive optical signals from a first link implemented by a first fiber optic cable 16 (also indicated as the primary link by the character "P"). The apparatus 10 is similarly connected at the second port 14 both to transmit optical signals into and to receive optical signals from a second link implemented by a second fiber optic cable 18 (also indicated as the secondary, or redundant, link by the character "S"). To this end each port 12, 14 includes an optical receiver 22R, 24R and an optical transmitter 22T, 24T. The receiver 22R is operative to convert optical signals received at the module 10 on the cable 16 into electrical form. The transmitter 22T serves to convert electrical signals transmitted from the apparatus 10 into optical form for propagation over the cable 16. The transmitter 24T and the receiver 24R serve analogous functions for any transmissions over the cable 18 connected at the port 14. The transmitters 22T, 24T are respectively controlled by enabling signals applied over control lines 26, 28, respectively.

During fault-free operation, communications in the form of information packets are received by the station 10 from another station over both of the cables 16, 18. In such a case, one of the fiber optic cables, e.g., the cable 16, defines the primary communications link for the station having the apparatus 10. The other of the fiber optic cables, i.e., the cable 18, during such fault-free operation defines a secondary communications link between the stations. Transmissions between the stations over the first and the second cables 16, 18 may be conducted in either the synchronous or the asynchronous mode. If in the asynchronous mode each port 12, 14 conforms to the IEEE 802.3 FOIRL standard for asynchronous operation. In the instances where it may be desirable for the station 10 to communicate in a synchronous communications mode such synchronous operation is expected to conform to the IEEE 802.3 10BASE-F Draft standard.

In accordance with the present invention, the apparatus 10 includes first means, generally indicated by the reference character 30, operatively connected to both the first fiber optic cable 16 and to the second fiber optic cable 18 for generating an indication signal when an information signal, such as a packet of information, arrives on either the first or the second cables 16, 18. In practice, the means 30 includes a first carrier sense network 30A connected over a line 32A to the receiver 22R associated with the port 12 and a second carrier sense network 30B connected over a line 32B to the receiver 24R associated with the port 14. The signal output from the carrier sense network 30A is carried on a line 34A and is an indication signal representative of the arrival of an information signal to the port 12 over the cable 16. The signal output from the carrier sense network 30B is carried on a line 34B and provides an indication signal representative of the arrival of an information signal to the port 14 over the cable 18.

Means generally indicated by the character 38 responsive to the indication signals on the line 34A or 34B generate an error signal in the event of the absence (or nonreceipt) of an information signal on one of the cables 16, 18 within a predetermined time period following the receipt of an information signal over the other of the cables 18, 16. In the embodiment illustrated, the means 38 include a control logic network 40 connected to the output lines 34A, 34B from the carrier sense networks 30A, 30B. A timer 42 is triggered by the logic 40 over an enabling line 44 output therefrom. A counter 46 is connected to both the timer 42 (over a line 48) and to the logic network 40 (over a line 50). The counter value output from the counter 46 is fed back, via a line 52, to the logic network 40. In the preferred implementation the counter 46 is operative to count in a domain between zero and a predetermined reference count N in a given direction upon the occurrence of a clock signal from the timer 42 on the line 48. The signal on the line 50 controls the direction of the count in the counter 46.

An error signal output from the means 38 (specifically, from the logic network 40) is applied over a line 54 to a port assertion logic network 58. The port assertion logic 58 is connected to the transmitters 22T, 24T over the transmitter control signal lines 26, 28, respectively. The port assertion logic 58 defines means responsive to the error signal on the line 54 for switching the primary communications link to the second cable (i.e., from the cable 16 to the cable 18) and the secondary communications link to the first cable (i.e., from the cable 18 to the cable 16) upon the occurrence of a predetermined number of error signals.

Each of the carrier sense networks 30A, 30B used in the module of FIG. 1 measures the frequency of the idle signal carried on the cable with which the sense network is associated. For asynchronous mode operation the idle frequency is set by the IEEE 802.3 FOIRL asynchronous standard to be one MHz., (+25%, 15%). Each of the carrier sense networks 30A, 30B includes an edge detector 60 connected to a counter/decoder 62 over a line 64. Each of these elements is connected to the line 32A, 32B, as the case may be, from the associated receiver 22R, 24R respectively. The output of the edge detector 60 applied to the counter/decoder 62 is used as a time base for counting the number of cycles of a predetermined reference frequency signal (e.g., twenty Mhz.) that occur during the interval of the idle signal (and information packet). For an IEEE 802.3 FOIRL standard-based system twenty cycles would be counted during the one microsecond interval or cycle time of a one MHz. signal (and five cycles for an information packet). The counter/decoder 62 provides the output indication signal representative of the arrival of an information signal on the output line 34A, 34B.

In the preferred instance, the functional elements shown as the means 38 and 58 are implemented using a programmable array logic such as that manufactured by Altera Corporation of San Jose, Calif. and sold as Altera 1810. The counter may be implemented using a TTL device sold as part number 74191. In the preferred implementation the counter 46 and the control logic 40 are configured such that once the counter has reached the limit value at each end of its domain, further enabling signals in either an incrementing or a decrementing direction will not increase or decrease the value of the count past the limit N or below the limit zero, as the case may be. Each carrier sense networks 30A, 30B is configured using parts 7400, 7474, and 74175 (for the edge detector 60) and 16V8 programmable array logic (for the counter/decoder 62). Of course, other suitable implementations using, for example, integrated circuit components or devices operable in accordance with a program, may be used.

Figure 2:
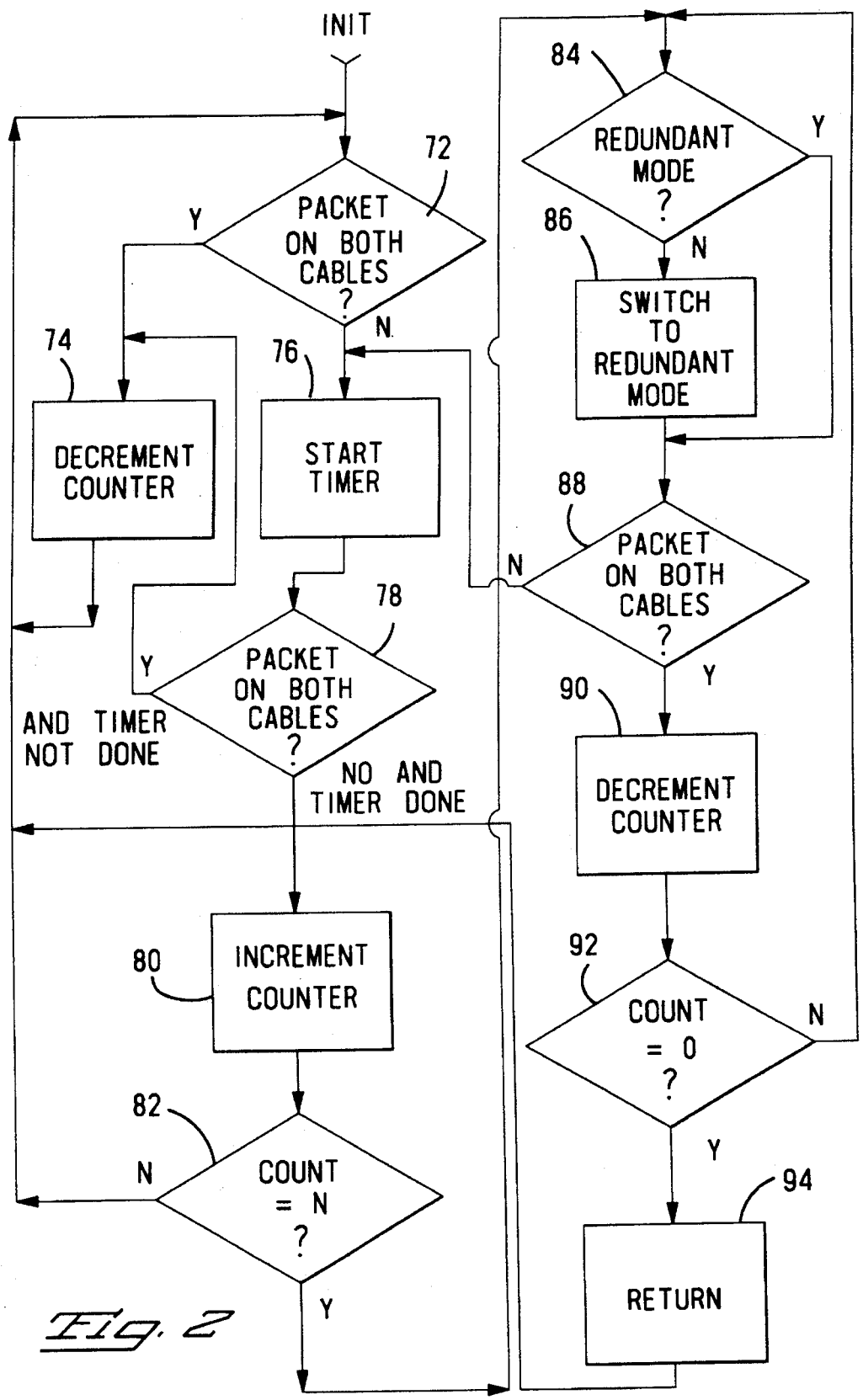
FIG. 2 is a flow diagram of the steps of a method of switching between primary and secondary communications links in accordance with the present invention.

With reference now to FIG. 2, shown in flow diagram form is a method in accordance with the present invention for switching the primary communication link from one of the two cables 16, 18 connected to the apparatus of FIG. 1.

Assuming that the stations are communicating in the asynchronous mode and assuming normal (fault-free) operating conditions prevail upon initialization (INIT.), the primary communications link to and from the apparatus 10 is the cable 16, with the secondary communications link for the apparatus 10 being defined by the cable 18. As long as each information packet received over the Ethernet network connecting the apparatus 10 with another apparatus appears on both the primary link 16 and on the secondary link 18 (as indicated by the presence of a carrier sense signal output on both the lines 34A, 34B), the counter 46 remains at its initial limit (e.g., zero count). In FIG. 2, the affirmative outcome of the decision block 72 is applied to an action block 74. However, this action will not change (e.g., decrement) the count below its lower limit configuration of the counter when implemented in the preferred manner. It will be recalled that in the preferred implementation application of enable signals to the counter, as on the line 48, will not change the value in the counter beyond its limit.

In the event of some error on the primary link 16, a packet of information will appear at the station 10 only on the secondary link 18. A negative outcome of the decision block 72 will result in a carrier sense signal being present only on the output of the network 30B. The control logic 40 responds to the presence of a carrier sense signal to start the timer 42 over the line 44, as is indicated in FIG. 2 by the block 76. The period of the timer 42 is selected in accordance with the IEEE 802.3 FOIRL asynchronous standard, and is conveniently set at twenty-six (26) microseconds. In other instances, and/or in other networks, it may be convenient to select the period of the timer 42 as some convenient fraction (e.g., one-half) of the slot time of the network.

If at the end of the period of the timer 42 an indication signal is not generated by the carrier sense network 30A the counter 46 is moved in an incrementing direction by the timer 42 over the line 48. This action is indicated in the blocks 78, 80 in FIG. 2.

When the absence of an information packet on one of the cables within a predetermined time period following the receipt of an information packet over the other of the cables, as just described, has been repeated a predetermined number of times N and the value of the count in the counter 46 reaches that count N, the network 40 outputs an error signal on the line 54 to the port assertion logic 58. This action is indicated at the decision block 82. It should be understood that the present invention may be implemented such that the number N may represent either N successive unmatched receptions or N unmatched receptions (whether or not successive) within a convenient time period.

The logic 58 responds by generating signals on the lines 26, 28 which serve to switch the primary communications link to the redundant second cable 18 and the secondary communications link to the first cable 16. This action is indicated in blocks 84, 86 in FIG. 2. Any convenient numerical threshold N may be selected. In a typical implementation the switching to the redundant link occurs when the number of error signals reaches fifteen (e.g., N=15 in block 82, FIG. 2).

After switching has occurred both cables are still monitored, as at the block 88. A negative outcome branches action back through the blocks 76, 78, 80, 82, 84 and 86. Note again that, owing to the preferred implementation of the counter 46, attempts to increment the counter beyond its upper limit (as at the block 80) cause the count to remain at the value N.

If after switching (block 86) an affirmative outcome at the block 88 indicates the receipt of a packet within the time period of the timer 42 on both the primary and secondary cables 16, 18 the counter 46 is decremented, as indicated at the block 90 (i.e., the direction of the count being changed in accordance with the signal on the line 50). Control branches as indicated at the block 92 until the count returns to zero, at which time the normal operation is restored, as indicated at the block 94.

It is again emphasized that even though the previous discussion has spoken in terms of incrementing the counter (changing the count in an upward direction) upon the absence of a packet on the primary link within the period of the timer of receipt of a packet on the secondary link, the counter could be preset with the predetermined count and decremented (changing the count in an downward direction) by the action at block 80. Conversely, in such an event, the action of blocks 74, 90 would serve to increment the counter 46. Such clear reversal of count is to be construed as an equivalent lying within the contemplation of the present invention.

Figure 3A:
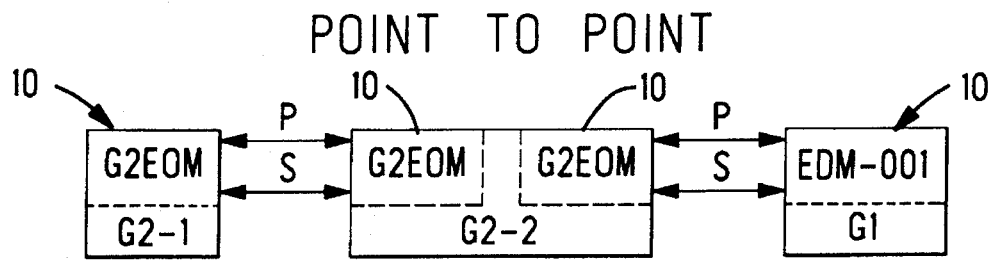
FIGS. 3A, 3B and 3C are diagrammatic views illustrating various environments in which the apparatus shown in FIG. 1 or the method diagrammed in FIG. 2 may be used.
Figure 3B:
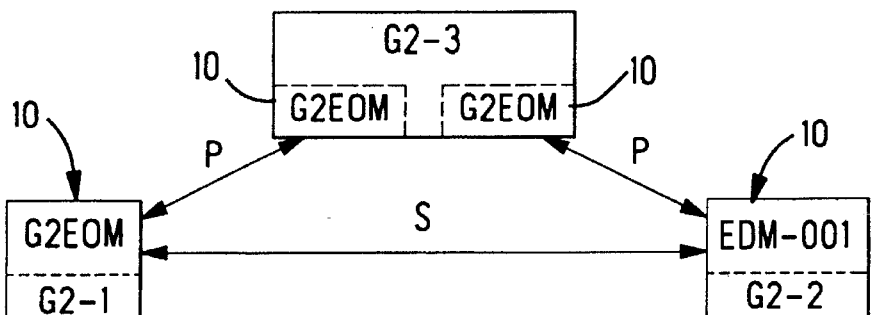
Figure 3C:
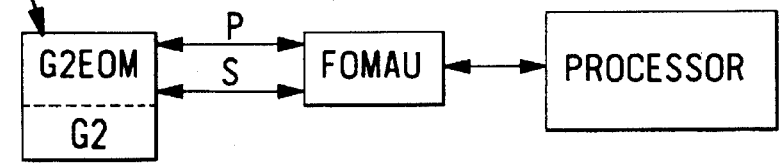

With reference now to FIGS. 3A, 3B and 3C, shown are various environments in which the apparatus 10 and method in accordance with the present invention may be used.

FIG. 3A illustrates an arrangement which utilizes two apparatuses 10 to provide point-to-point connection between concentrators in a fiber optic local area network. In this arrangement communication between a concentrator G2-2 having at one end a concentrator G2-1 with an apparatus 10 associated therewith and at the other end of the link a device without a redundant link function such as a G1 concentrator with an EDM-001. A packet of information sent by a first apparatus 10 in the concentrator 62-2 to the G1 concentrator is sent only over the primary link P. For transmission from the concentrator G1, packets of information are sent over both the primary link P and the secondary link S. The modules 10 will monitor their respective pairs of primary and secondary links as discussed above. During normal operation the information on the secondary link is discarded. Receipt of a packet of information on the secondary link 5 and a corresponding absence of the corresponding packet on the primary link P will result in the redundancy control operation explained in connection with FIG. 2.

The communication between the concentrators G2-1, G2-2 is a peer to peer communication. Both primary and secondary links are used between both of the apparatus 10 in both communication directions. Operation of the apparatus 10 associated with each of the concentrators is as discussed earlier.

FIG. 3B shows concentrators G2-1, G2-2, and G2-3, each with an apparatus 10 associated therewith, connected in a ring-like topology to provide alternate paths. One path is again the primary P and another a secondary S. In FIG. 3B the primary path between the concentrators G2-1 and G2-2 is through the concentrator G2-3 and the secondary path is directly between them. To send a packet to G2-2 the apparatus in the concentrator G2-1 sends duplicate packets to the concentrator G2-2 via the primary path through the concentrator G2-3 and directly to G2-2 via the secondary path. If the primary path is available, the module in the concentrator G2-2 passes the packets arriving at its receive port and discards the packets on the secondary. Should the primary become unavailable, the secondary path will be switched to become the primary path to maintain communication between the concentrators G2-1 and G2-2.

As shown in FIG. 3C, the apparatus 10 can also be used to provide alternate paths to a processor-based system via a fiber optic media attachment unit (FOMAU). Operation is identical as in point-to-point communication (FIG. 3A).

Those skilled in the art, having the benefit of the teachings of the present invention as hereinabove set forth may effect numerous modifications thereto.

For example, although the comparisons hereinabove discussed have been directed toward packets of information received on the first and second links, it should be clear that the present invention may also be extended to compare the packets bit-by-bit. In addition, it should be understood that instead of monitoring the receipt of packets of information the present invention may also be used to compare the receipt of individual information bits on each cable. Therefore the term "information signal" as used in the claims is to be construed to encompass both packets of information and individual bits within a packet. It is again noted that although east in terms of an IEEE 802.3 FOIRL network the redundancy control system of the present description may be used with any broadcast network, implemented using any suitable media.

Such modifications as are discussed herein and which appear to those skilled in the art are to be construed as lying within the scope of the present invention, as defined by the appended claims.

What is claimed is:

1. Apparatus for a first station connectible in a broadcast network with a second station over both a first link and a second link, the first link during fault-free operation being a primary communications link and the second link during fault-free operation being a secondary communications link, the apparatus comprising:

first means connected to both the first and the second links for generating respective indication signals each representative of an information signal arriving over a respective one of the first link or the second link;

logic means coupled to the first means and responsive to an indication signal for generating a first error signal in the event of an information signal not arriving on one of the links within a predetermined time period following an information signal arriving over the other of the links and a second error signal in response to a predetermined number of said first error signals; and switching means coupled to said first and second links and to said logic means and responsive to the second error signal for switching the primary communications link to the second link and the secondary communications link to the first link.

2. The apparatus of claim 1, wherein the logic means comprises a timer responsive to the occurrence of the indication signal for providing the first error signal said predetermined time period after the indication signal occurrence, and a counter associated with the timer and responsive to said first error signal for changing the count in the counter in a first direction, said counter providing said second error signal upon its count reaching said predetermined number.

3. The apparatus of claim 2 wherein the logic means includes means coupled to the counter and responsive to an indication signal corresponding to receipt of an information signal on the one of the links within the period of the timer for changing the count in the counter in a second direction.

4. The apparatus of claim 3 wherein the counter has a predetermined count limit in both the first and second directions.

5. The apparatus of claim 2 wherein the counter has a predetermined count limit in the first direction.

6. A method for switching between a first link and a second link connecting a first station with a second station in a broadcast network, the first link during fault-free operation being a primary communications link and the second link during fault-free operation being a secondary communications link, the method comprising the steps of:

(a) generating an indication signal representative of an information signal arriving over the first link or the second link;

(b) in response to an indication signal, generating an error signal in the event of an information signal not arriving on one of the links within a predetermined time period following an information signal arriving over the other of the links; and (c) switching the primary communications link to the second link and the secondary communications link to the first link upon a predetermined number of error signals occurring.

7. The method of claim 6 further comprising the step of (d) restoring the primary communications link to the first link when an information signal is received on both of the links within a predetermined time period.

8. The method of claim 6 further comprising the step of (d) restoring the primary communications link to the first link when a predetermined number of information signals are received on both of the links, with each information signal on a link being received within a predetermined time period of the corresponding information signal on the other link being received.

* * * * *